United States Patent
Klein et al.

[15] 3,688,255
[45] Aug. 29, 1972

[54] ELECTRICAL WARNING SYSTEM FOR VEHICULAR BRAKE INSTALLATIONS

[72] Inventors: Hans-Christof Klein, Hattersheim, Main; Hans Beller, Bad Vilbel; Gert Schrader, Schweinfurt, all of Germany

[73] Assignee: Alfred Teves Maschinen-und Armaturenfabrik KG, Frankfurt am Main, Germany

[22] Filed: Sept. 2, 1970

[21] Appl. No.: 68,849

[30] Foreign Application Priority Data

| July 21, 1966 | Germany | T 31 640 |
| July 27, 1966 | Germany | T 31 689 |
| Aug. 6, 1966 | Germany | T 31 790 |
| Aug. 6, 1966 | Germany | T 31 789 |
| Sept. 1, 1966 | Germany | T 31 962 |
| Dec. 7, 1966 | Germany | T 32 694 |

Related U.S. Application Data

[62] Division of Ser. No. 652,760, July 12, 1967, Pat. No. 3,588,810.

[52] U.S. Cl. ........................ 340/52 C, 200/81.4
[51] Int. Cl. ........................................ G08b 21/00
[58] Field of Search ........ 340/52, 52 C; 200/81.4, 82, 200/83

[56] References Cited

UNITED STATES PATENTS

| 3,011,595 | 12/1961 | Heiss et al. | 340/52 C |
| 3,439,322 | 4/1969 | Gardner | 340/52 C |
| 3,312,936 | 4/1967 | Huntzinger | 340/59 |
| 3,439,323 | 4/1969 | Kersting | 340/52 C |

*Primary Examiner*—Alvin H. Waring
*Attorney*—Karl F. Ross

[57] ABSTRACT

Brake system having a pair of fluid-operated brake networks including substantially concurrently actuable master-cylinder chambers and respective sets of wheel brakes communicating therewith, an ignition battery, a brake or tail lamp energizable by the battery upon operation of the brake pedal, and a pair of fluid-responsive switches each operatively connected with a respective one of said networks for operating an electrical warning lamp on the dashboard effective upon failure of hydraulic pressure in one of the networks for indicating such failure.

8 Claims, 8 Drawing Figures

INVENTORS
HANS CHRISTOF KLEIN
HANS BELLER
BY GERT SCHRADER

Karl F. Ross
ATTORNEY

INVENTORS
HANS CHRISTOF KLEIN
HANS BELLER
GERT SCHRADER
BY Karl G. Ross
ATTORNEY

INVENTORS
HANS CHRISTOF KLEIN
HANS BELLER
BY GERT SCHRADER

Karl G. Ross
ATTORNEY

INVENTORS
HANS CHRISTOF KLEIN
HANS BELLER
BY GERT SCHRADER

Karl F. Ross
ATTORNEY

ELECTRICAL WARNING SYSTEM FOR VEHICULAR BRAKE INSTALLATIONS

Cross-reference to Copending Application

This application is a division of application Ser. No. 652,760, filed July 12, 1967, now U.S. Pat. No. 3,588,810.

FIELD OF THE INVENTION

Our present invention relates to improved electrical signaling and warning systems for the brake installations of an automotive vehicle and, more particularly, to a signaling system for indicating failure of one or both of a plurality of brake networks.

BACKGROUND OF THE INVENTION

It is common practice in current automotive technology to provide warning and signaling systems capable of indicating failure of one or another of the vital parts of the vehicle mechanism. It has thus been proposed to provide, at the master cylinder of a hydraulic brake, a pressure-responsive switch which may illuminate the brake light of the vehicle to indicate to following drivers that the brakes of the preceding vehicle have been applied.

It has been suggested to modify a pressure-sensitive switch of this type so as to enable it to respond to failure of brake pressure and provide an indication of such failure by means of an acoustical or optical signal at the dashboard.

In other arrangements, dual-brake systems in which independent but interconnected master cylinders supply fluid under pressure to respective sets of wheel-brake cylinders and are assigned respective conduit networks, have been provided with membrane arrangements, floating pistons or the like adapted to transmit force between the hydraulic networks without forming a fluid connection therebetween. Such systems and pressure-equalizing arrangements have been provided with conventional switching devices capable also of revealing to the operator of the vehicle the failure of one or another section of the brake system. All of these prior-art arrangements, especially those for dual-brake systems, have proved to be highly complicated and to be ineffective in large measure. It should be noted that a warning device which is responsive to the effectiveness or ineffectiveness of the braking networks is especially important since a failure of one network is often unnoticed by the operator from his tread upon the brake pedal.

OBJECTS OF THE INVENTION

It is, therefore, the principal object of the present invention to provide an improved electric warning or signaling device for dual-network vehicle-brake systems.

Still another object of this invention is to provide an electric warning system which can be connected in a simple and economical manner to the electrical circuitry of an automotive vehicle and is effective for notifying the driver of the failure of the individual brake networks.

A more specific object of this invention is to provide an improved monitory system for checking the state of readiness or operability of the warning and signaling system.

SUMMARY OF THE INVENTION

These objects and others which will become apparent hereinafter are attainable, in accordance with this invention, in an electric warning system for a dual-network hydraulic brake system having a pair of master cylinder or a subdivided master cylinder with a pair of working compartments (generally a tandem master cylinder) whose outputs are connected by respective hydraulic transmission lines to the respective sets of wheel-brake cylinders and may operate disk-type or internal-expansion brakes of conventional character, the improved warning device having a pair of warning indicators (e.g., lamps) mounted upon the dashboard of the vehicle and a pair of pressure-responsive on/off switches mounted in the respective hydraulic networks and connected in circuit with the respective lamps or with a lamp and a substitute resistance (in series). Push-button means may also be provided for releasing an electromagnetic relay which retains the warning lamp in its energized condition. The relay is advantageously provided with a locking or detent arrangement whereby the illuminated warning lamp, indicating the failure of a brake system, can only be extinguished by manual actuation of another member apart from the test and operating systems of the circuit and indeed preferably mechanically linked to a switch such that, on the relay so energized, its armature cannot be released by any electrical action whatever. This system insures that there will be no accidental or intentional extinction of the warning light while the danger remains. It is also advantageous to provide for a time delay in the warning lamp circuit as will be apparent hereinafter.

DESCRIPTION OF THE DRAWING

The above and other objects, features and advantages of the present invention will become more readily apparent from the following description, reference being made to the accompanying drawing in which.

SPECIFIC DESCRIPTION

Figures 7, 8:
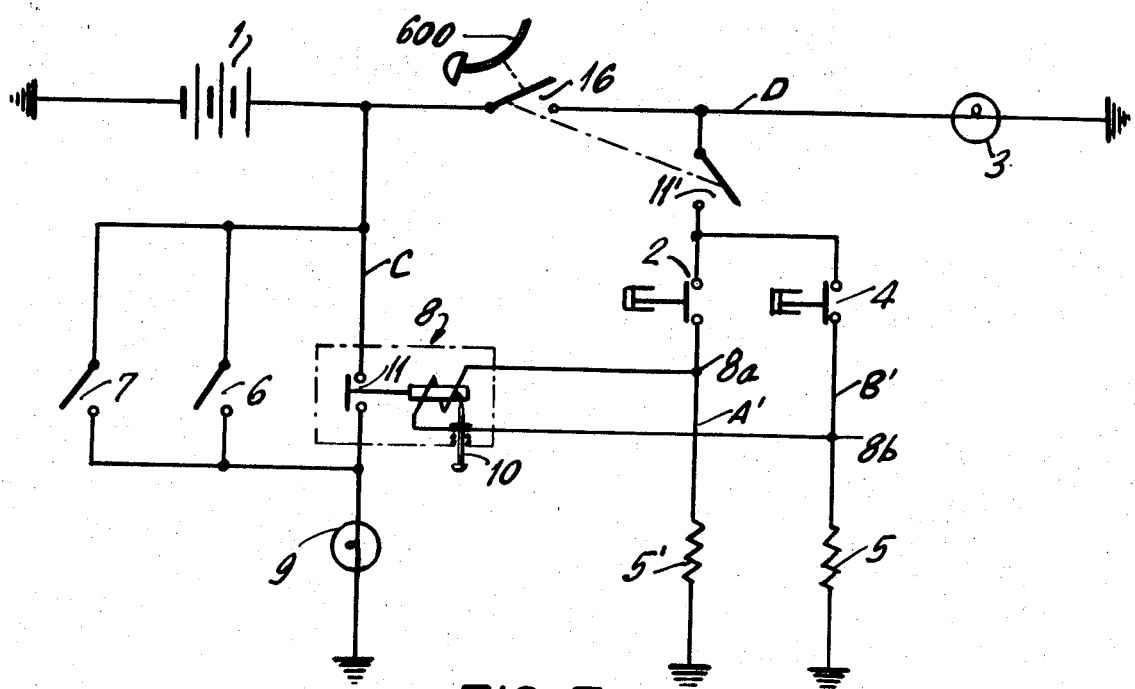
FIG. 7 is a circuit diagram representing a modification of the system of FIG. 1.
FIG. 8 is a diagrammatic axial cross-sectional view of a tandem master cylinder and a view of a brake systems in accordance with the present invention.

Referring first to FIG. 8, in which we show a dual-brake system for an automotive vehicle, it will be apparent that the brake pedal 100, which is pivotally connected to the vehicle body at 101, bears upon the piston rod 102 of a master cylinder 103 which is shown in diagrammatic form. The tandem master cylinder 103 is provided with the usual fluid receptacle 104 forming a reservoir for the hydraulic brake fluid and communicating with the two working chambers of the master cylinder 103 whose outlets 105 and 106 are connected respectively ahead of their pistons 107 and 108 to conduits 109 and 110 of the two sets of brakes. The brakes are here shown as disk brakes 111 straddling the respective brake disks 112 which are connected to the wheels or the axles of the vehicle in the usual manner. The yokes of the disk brakes 111 may be mounted on the chassis or the axle housing and each has a pair of wheel-brake cylinders represented diagrammatically at 113 and 114. Duct 109 is connected with the front-wheel brake cylinders 113 of the respective disk brakes while the rear-wheel cylinders 114 are supplied by line 110. Between the working chambers of the tandem master cylinder 103 and the respective conduit 109 or 110, there is provided a stop-light switch 115 or 116, two contacts of which are connected in circuit with the brake light or stoplight at the rear of the vehicle so as to indicate to following drivers that the brakes have been applied. Furthermore, a liquid-level-responsive switch 117 is provided at the reservoir 104 to indicate the failure of brake-fluid supply. It will be understood, therefore, that reference below to a liquid-level-responsive switch 6 in the descriptions of the warning circuits are intended to refer to switches of the type illustrated at 117 whereas the pressure-responsive switches 115 and 116 of the respective hydraulic networks are equatable to the stoplight switches 2 and 4.

Figure 1:
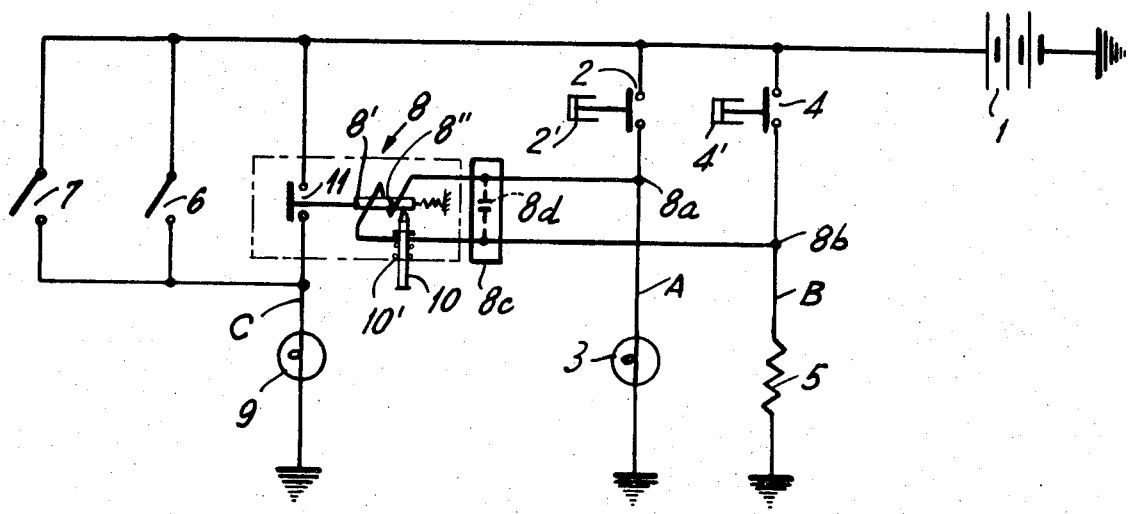
FIG. 1 is a circuit diagram of a dual-brake warning system embodying the present invention.

In the warning circuit of FIG. 1, there is illustrated an arrangement in which the fluid-pressure responsive brake or stoplight switches 2 and 4 are represented as being operated by piston-and-cylinder arrangements 2' and 4', it being understood that substantially any pressure-sensitive switch arrangement may be employed. One terminal of each of these stoplights switches 2, 4 is connected to the ungrounded pole of the battery 1 representing, of course, the usual ignition battery of the vehicle. Switch 2, of the front-wheel brakes, is connected in series with the positive terminal of battery 1 and a brake lamp 3 whose other side and the negative pole of battery 1 have a common ground. The stoplight switch 4 of the rear wheel brakes is connected in series with a test resistor 5 whose resistance is equal to that of the lamp 3, across the terminal of the battery. The two circuits thus constituted are identified generally as circuits A and B.

Parallel to the circuits A and B, we provide a further circuit C having a pair of contacts 11 in series with a warning lamp 9 on the dashboard of the vehicle across the battery 1. Switch 11 is closed by the armature 8' of a relay 8 and can be shunted by either or both of a pair of switches 6 and 7. Switch 6 is a liquid-level-responsive switch (e.g., as shown at 117) while switch 7 is a control, test and/or mechanical-brake switch whose function is described in greater detail below. The coil of relay 8 is connected across the circuits A and B beyond the respective stoplight switches 2 and 4 and thus is tied to these circuits between the respective stoplight switch 2 or 4 and the lamp 3 or the resistor 5. The relay is also provided with a locking device in the form of a plunger 10 which, upon movement of the armature 11 to the right (FIG. 1), is urged by a spring 10' into a notch 8'' of the armature 8' and locks the relay in its circuit-closing position until the plunger 10 is manually withdrawn to release the lock.

Upon actuation of the brake pedal 100 and proper supply by the tandem master cylinder 103 of hydraulic fluid to the front-wheel brake cylinders 113 and the rear-wheel cylinders 114, the pressure applied at switches 115 (2) and 116 (4) closes these switches so the current flows simultaneously through both circuits A and B. The current flow through circuit A, of course, 1luminates the stoplight 3. Since the resistor 5 has a voltage drop across the lamp 3, the voltage differential across points 8a and 8b is zero and no voltage is applied to the coil 8.

In the event of failure of the rear-brake system 106, 110, 114, stoplight switch 4 (116) is unenergized and only switch 2 (115) is closed. The stoplight 3 is energized while a potential difference develops between points 8a and 8b to energize the relay 8 and close the switch contact 11. Upon closure of switch 11, the warning lamp 9 is connected to the battery 1 and illuminates to indicate a defect in the brake system. Plunger 10 locks into the armature 8' and maintains the defect indication until the plunger 10 is withdrawn even through the circuits A, B may be de-energized by release of the brake pedal 100. In the event the plunger 10 is withdrawn prior to repair of the brake, the warning indicator will be locked on again at each subsequent actuation of the brake pedal.

Upon failure of the front-wheel brake system 105, 109 and 113, switch 2 (115) remains unactivated while switch 4 is closed. Current flows from switch 4 through the coil of the relay A to illuminate the warning light 9 and, since lamp 3 lights in series with the coil 8'', the stoplight 3 is likewise illuminated although to a decreased degree. This is important since, when the front brakes fail, the overall braking effect is markedly reduced as is indicated by the decreased illumination of the stoplight 3. To prevent illumination of the warning light 9 because of adventitious spacing in the closure of switches 2, 4 when the brake pedal 100 is actuated, we provide a time-relay network 8c at the relay 8 to render the coil 8'' effective only after sufficient time has elapsed for the brake actuation to have occurred and any disparity of the pressurization in lines 105 and 106 overcome. The time-delay network 8c may include any time-constant arrangement, such as a capacitor 8d connected across the coil. Switch 6 closes upon failure of the brake-fluid supply and illuminates lamp 9. By triggering the plunger 10, the vehicle operator can readily ascertain that the relay lock has not been actuated under these conditions and that the warning light 9 is thus indicting a failure of fluid supply and not a pressure loss in one of the brake networks. In order to ascertain whether the warning system (especially the lamp 9) is in good order since the lamp is normally not illuminated, the test switch 7 is provided and the vehicle operator by depressing this switch or by momentarily actuating it in the course of turning on the ignition will illuminate the lamp 9 to indicate that it is indeed operative.

Figure 2:
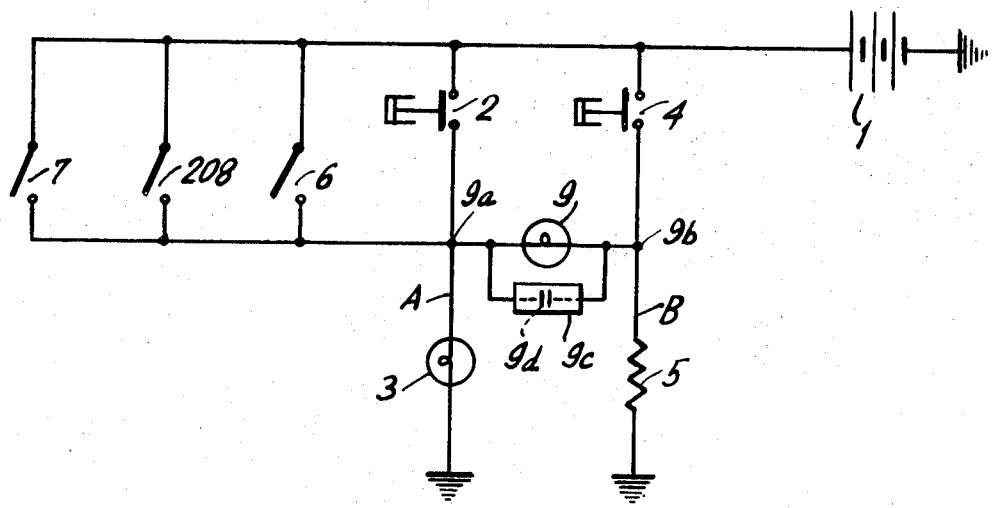
FIG. 2 is a circuit diagram of a modified warning system in which the relay of the system of FIG. 1 is omitted.

In FIG. 2, we show a modified circuit arrangement wherein the ignition battery 1, grounded at one terminal, feeds the stoplight switches 2 and 4 which constitute part of the respective circuits A and B as described earlier. Circuit A also includes the brake light 3 connected in series with the stoplight switch 2 while circuit B includes a resistor 5 whose ohmic resistance is equal to that of the lamp 3. In this case, the warning lamp 9 on the dashboard of the vehicle is connected between the points 9a and 9b of the circuits A and B and indicates, upon illumination, the presence of a voltage differential across the two circuits representing failure to close one of the stoplight switches. In parallel with the stoplight switch 2, we provide the fluid-level-responsive switch 6, the control or "test" switch 7 and a brake light switch 208 whose function is to illuminate the stoplight 3 when a mechanical brake is actuated. The term "mechanical brake" is used herein to refer to the emergency, parking or locking brake of the vehicle, a transmission brake actuated by bowden line from the driver's position, or any other supplemental brake arrangement. Under normal operation of the tandem master cylinder, the stoplight switches 2 and 4 are actuated concurrently so that the current flow through the circuits A and B is identical and the brake light 3 is illuminated. There is no potential drop across the network and the indicator lamp 9 remains inoperative. In the event the rear wheel brakes fail because of a defect in the hydraulic network thereof (cf. FIG. 8), only switch 2 is closed, thereby illuminating the brake light 3 with full intensity and applying a potential across the indicator light 9. This lamp is then illuminated to indicate to the driver that there has been a failure in one of the brake networks. In case of failure of the front wheel brakes, switch 4 closes while switch 2 remains open and the warning lamp 9 is energized in series with the lamp 3. The brake light 3 is thus illuminated with a reduced intensity to reveal the failure of the front wheel brakes and a corresponding decrease in the braking effectiveness of the entire system. Again, illumination of lamp 9 indicates failure of one of the brake networks. To preclude illumination of lamp 9 in the event of nonconcurrent actuation of the switches 2 and 4, as described earlier, a time-delay network 9c, advantageously consisting of a capacitor 9d connected in parallel with the lamp 9, is included in the warning lamp circuit. It should be noted that this circuit also has the advantage that, when switch 6 is closed to indicate a decrease in the liquid level in the brake-fluid reservoir below a predetermined point, warning lamp 9 is illuminated even when the switches 2 and 4 are deactivated. This arrangement advises the driver to check the fluid level upon his finding that the lamp remains lit even when the brake is not operative. The test switch 7, which may be tripped automatically when the ignition switch is turned on by pushbutton from the dashboard, permits the vehicle operator to test the normally nonilluminated lamp. The mechanical brake switch 208 indicated by illumination of the stoplight 3 and the warning lamp 9 to both the driver and trailing vehicles that the handbrake has been applied. This is important during hill climbing and descents as well as in starting, since the driver is made aware that he has not yet released the handbrake.

Figure 3:
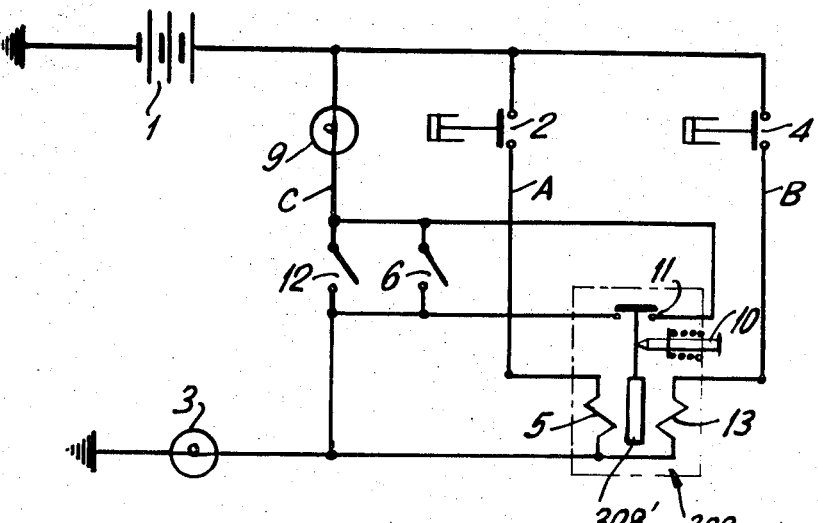
FIG. 3 is still another circuit diagram with a modified relay arrangement.

The modification of FIG. 3 provides, in addition to the networks A and B, a relay 308 which functions generally similarly to the relay 8 of FIG. 1. In this embodiment, the stoplight switch 2 of the front wheel brakes is connected in series with a coil 5 in series with the brake light 3 across the battery 1; the rear-wheel pressure-actuated switch 4 of circuit B is connected in series with the battery 1, a further relay coil 13 whose resistance is equal to that of coil 5, (the coils being wound oppositely) and the brake lamp 3. The warning lamp 9 is connected between the positive terminal of the battery 1 and grounds in series with the brake lamp 3 via the contact 11 of the relay 308 while the fluid-level switch 6 and a mechanical brake switch 12 are in parallel with these contacts 11.

The spring-biased plunger 10 is engageable with the armature 308' of the relay 308 to lock this relay in its closed position until the plunger 10 is manually withdrawn. When the tandem master cylinder functions properly, the stoplight switches 2 and 4 close substantially simultaneously to energize the coils 5 and 13 in opposite senses and thereby cancel the magnetic effect upon the armature 308'. The brake lamp 3, in series with the coils 5 and 13, illuminated at full strength. Switch 11 remains open and the warning lamp 9 is not illuminated. In the event of failure of the rear wheel brake, switch 4 of circuit B remains open while switch 2 closes to energize coil 5 and displace the armature 308' while illuminating brake lamp 3 at a fraction of its normal intensity, thereby indicating a weakening of the brake force. Armature 308' closes switch 11 and is locked in the closed position by the plunger 10 while connecting the lamp 9 in circuit and providing a visual indication of brake failure at the dashboard of the vehicle. Lamp 9 remains illuminated until the plunger 10 is manually withdrawn as described in connection with FIG. 1.

Upon failure of the front-wheel-brake network, switch 2 remains open while stoplight switch 4 is closed to energize the coil 13 and, with diminished intensity, the brake lamp 3. Armature 308' closes contact 11 to illuminate the warning lamp 9 and indicate brake failure. Again, the plunger 10 prevents opening of switch 11 even in the absence of brake operation until the plunger is withdrawn. The coils 5 and 13 may be provided with a time-delay network as previously described to prevent closure of switch 11 in the event the closure stoplight switches 2 and 4, although properly actuated by the tandem master cylinder, may be staggered with respect to one another. The liquid level switch 6, upon closure as a result of decrease in the brake-fluid level, connects warning lamp 9 in series with the battery 1 and provides a visual indication of the failure of the brake-fluid supply. The handbrake switch 12 illuminates the stoplights 3 and the warning lamp 9 when it is operated to indicate that the handbrake has not been released and provides an indication to trailing vehicles that the handbrake is applied during hill climbings or descents. It will be apparent that the coils 5 and 13 of the warning circuit C are bridged across the networks A and B and thus indicate a differential in the current flow therethrough.

Figure 4:
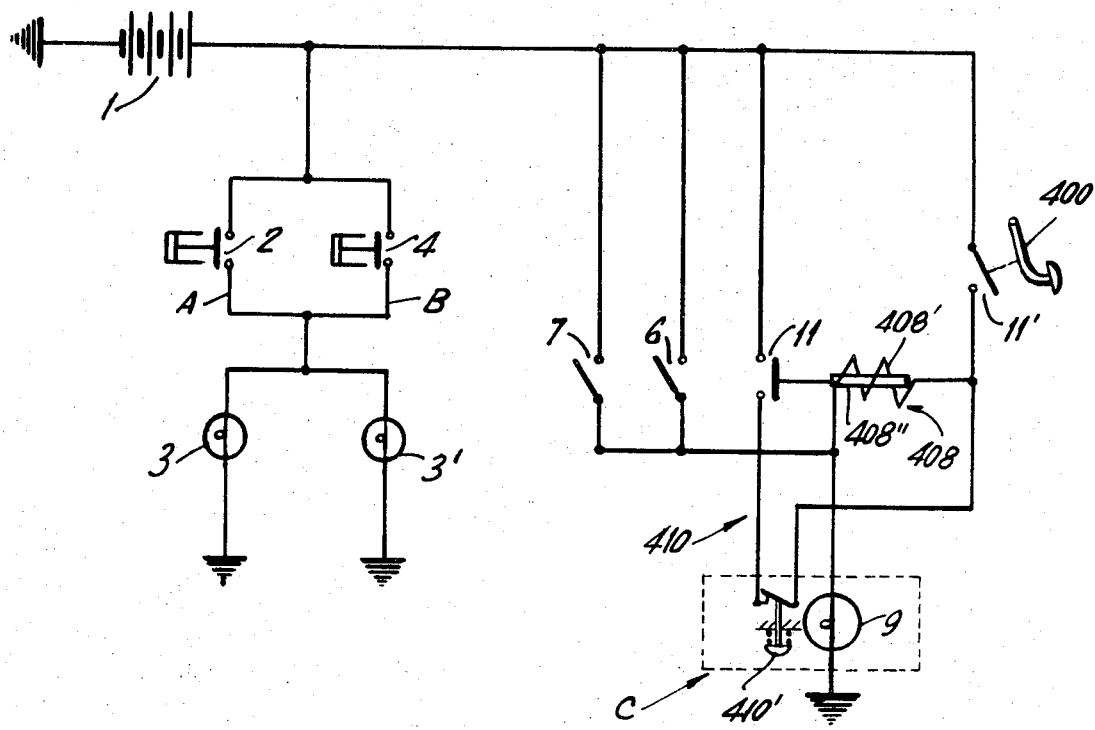
FIG. 4 is a circuit diagram of a warning system and stop-light arrangement according to another feature of this invention.

The circuit arrangement of FIG. 4 provides the front- and rear-brake stoplight switches 2 and 4 as previously described in a pair of networks A and B for operation in the usual manner. The warning circuit C is here completely separate form the stoplight circuitry A and B. The fluid-responsive switches 2 and 4 are connected in parallel with one another and in series with the brake lamps 3 and 3' across the battery 1 so that, when the tandem master cylinder is actuated, both switches or either switch closes to energize the lamps. The warning circuit C comprises a switch 11' which is actuated by the brake pedals 400 (cf. FIGS. 6 and 8) in series with the coil 408' of a relay 408 in circuit with the warning lamp 9 across the battery 1. The coil 408 is provided with a hold or locking circuit generally designated 410 and including a switch 11 operable by the armature 408'' of the relay and in series with a release switch 410' and the relay coil 408'. Switch 410', which is mounted upon the dashboard of the vehicle adjacent the lamp 9, is normally closed. In series with the lamp 9 across the battery 1 and in parallel with one another and with the relay coil 408', we provide a fluid-level switch 6 and a test switch 7. The test switch is in this case actuated by the ignition or sparking switch of the vehicle and by the handbrake so that it remains closed while the handbrake is operative and is momentarily closed during starting of the vehicle. In operation, the stoplight switches 2 and 4 are triggered hydraulically when the tandem cylinder is operating properly. Upon failure in one of the hydraulic networks or both, the stroke of pedal 400 exceeds a predetermined displacement (e.g., two-thirds of the total pedal travel) to close the switch 11' and energize the relay 408. Armature 408'' closes switch 11 and maintains the current flow through the coil 408' of the relay in the normally closed condition of switch 410', warning lamp 9 being illuminated through the switch 11 after initial illumination upon closure of switch 11'. Lamp 9 remains lit even after the pedal 400 is released to indicate to the driver that a brake failure has occurred. The lamp 9 can be turned off only by depressing switch 410' which performs the function of the plunger 10 previously described. Closure of switch 6, upon failure of the liquid level in the reservoir or of switch 7 as previously described, illuminates the lamp 9. This system has an advantage over those which require a resistance in series with one of the stoplight switches in that power lost because of the voltage drop across the resistance is avoided; furthermore, whenever the stoplights 3 are illuminated, they have full intensity.

Figure 5:
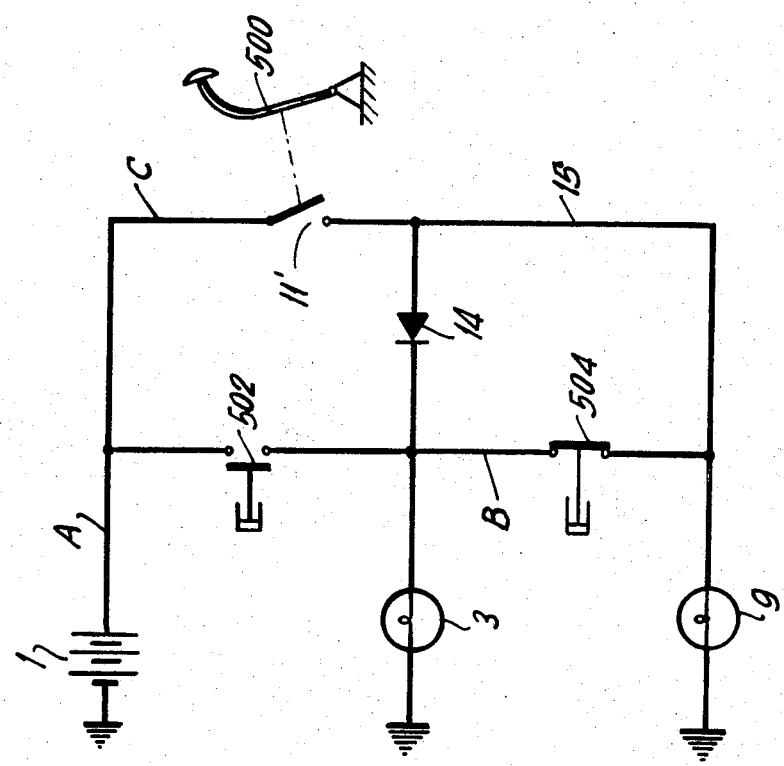
FIG. 5 is a circuit diagram of a somewhat more simplified assembly.

The embodiment of FIG. 5 again provides a switch 11' in series with the battery 1 and operable by the brake pedal 500 (cf. FIG. 8) for triggering the warning lamp 9. The stoplight switches 502 and 504 of the respective networks A and B are designed to illuminate the brake lamp 3 as will be apparent hereinafter. In this arrangement one terminal of the ignition battery 1 is grounded while the normally open pressure-responsive stoplight switch 502 is connected in series with the lamp 3 across the battery. Parallel to the switch 502, we provide the mechanically operable switch 11' which is closable by the pedal 500 in series with a diode 14 while a further circuit is provided in parallel to the brake light 3 and includes the normally closed rear-wheel pressure-responsive stoplight switch 504 in series with the warning lamp 9. The switch 11' and the diode 14 are connected via a conductor 15 with this lamp. When the front wheel brakes are functioning properly, depression of the brake pedal 500 operates the switch 502 and illuminates the stoplight 3. In a depressurized stage of the switch 502, its circuit with the lamp 3 remains open. Switch 11' closes upon excessive displacement of the pedal 500 (e.g., on two-thirds of its total stroke). Such excessive displacement occurs only when the brake network associated with the front wheel brakes, which commonly has a greater fluid-volume requirement than the rear brakes, fails. Upon actuation of the brake system, the rear wheel stoplight switch 504 opens at a working pressure of about 1–2 atmospheres (gauge) and upon further increase in the brake pressure, stoplight switch 502 closes at about 3–6 atmospheres (gauge) whereby the lamp 3 is energized over switch 502. In this condition, and prior to closure of switch 11', lamp 9 remains unenergized and no warning indication is given. Should there be a defect in the rear wheel brake, switch 502 will close without opening of switch 504 thereby connecting the warning lamp 9 in parallel with lamp 3 and indicating the fact of such failure to the vehicle operator. The switch 11' remains open since the volume of loss is not sufficient to permit the pedal 500 to undergo the excessive displacement mentioned earlier. When, however, the front wheel brake is defective, stoplight switch 4 opens and mechanical switch 11' is closed. The warning lamp 9 and the brake lamp 3 are then illuminated via the diode 14 and the line 15, respectively. When fluid-level switches or mechanical brake or test switches are provided as in the circuits of FIGS. 1 through 4, they are here connected in parallel with switch 11'.

FIG. 7 illustrates an arrangement similar to FIG. 1 wherein a switch 11' is connected mechanically to the brake pedal 600 and is coupled with a further switch 16 so that switch 11 is closed with a relatively small brake stroke to illuminate the brake lamp 3 in circuit therewith while switch 16 is closed only upon excessive stroke of the pedal as described earlier to initiate the warning system. In series with switches 11' and 16 across the battery 1, we provide respective networks A' and B', each including a fluid-pressure-responsive switch 2 or 4 (operated by the fluid pressure in the respective working chambers of the tandem cylinder) in series with identical resistances 5 and 5'. Connected across the networks A' and B' at points 8a and 8b, we provide a relay 8 which is lockable by the plunger 10 and operates switch 11 in series with the warning lamp 9 as described in connection with FIG. 1. In parallel with switch 11 are the fluid-level switch 6 and the mechanically operated test and/or handbrake switch 7. It will be apparent that this embodiment provides for operation of the lamp 3 at full intensity whenever the brake pedal 600 is depressed (via switch 16), while hydraulic failure in either of the brake networks renders the respective switches 2 and 4 operative while the others remain inoperative. The voltage differential sensed across the networks A' and B' energizes the relay 8 to close switch 11 and illuminates the warning lamp 9. The warning lamp 9 can only be turned off when the locking plunger 10 is manually withdrawn. The illumination of lamp 9 by temporary delay in the operation of one of the switches 2 or 4 is provided because of the inherent delay in closure switch 11' which requires substantial brake stroke. The same effect can be accomplished absent the switch 11', when the mechanically operated switch 16 is so constructed that it is not triggered as a consequence only of brake stroke but is responsive to the actuating force applied to the brake pedal. In this case, the brake force at which the switch closes should be such that the hydraulic pressure in the respective brake networks is sufficient to energize both switches 2 and 4 when their hydraulic networks are operating properly.

Figure 6:
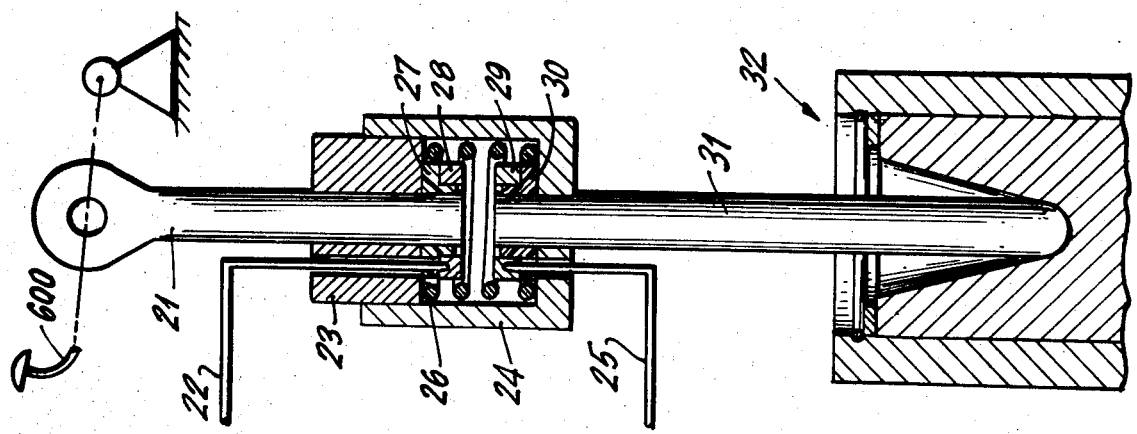
FIG. 6 represents an improved switch arrangement whose principles may be employed in the circuits of FIGS. 1 through 5.

Such a switch is illustrated in FIG. 6 in which the brake pedal 600 is shown to be provided with a rod 21 adapted to operate the piston rod 31 of the master cylinder 32. Rod 21 is received in a longitudinally shiftable sleeve 23 slidably received in a shell 24. Between the sleeve 23 and the shell 24, we provide a compression spring 26 to urge the switch members apart. On the confronting ends of the rods 21 and 32 within the sleeve 24, we provide respective contact rings 28 and 29 insulated from the movable members by annular insulating bushings 27 and 30. The wires 22 and 25 are led from the contact rings 28 and 29 through respective bores in the sleeve 23 and the shell 24. Upon actuation of the brake pedal 600, the operating force urges the rod 21 (FIG. 2) together with the guide sleeve 23, the spring 26 and the shell 24 to shift the rod 21 and actuate the tandem master cylinder. When the brake force exceeds the resilient force 26, the contact rings 28 and 29 are brought into engagement to close the circuit at switch 16. In this case, the stoplight switches 2 and 4 are connected to the network D between the switch 16 and the lamp 3. By varying the restoring force of spring 26, the brake force at which switch 16 becomes effective can be controlled.

We claim:

1. A brake system comprising:
   a pair of fluid-operated brake networks including substantially concurrently actuatable master-cylinder chambers and respective sets of wheel brakes communicating therewith;
   an electric source;
   switch means including a pair of fluid-responsive switches each operatively connected with a respective one of said networks and included in a respective circuit connected across said source;
   electrical warning means bridged across said circuits for energization upon the development of a differential in the current flow through said circuits upon failure of hydraulic pressure in one of said networks for indicating such failure, each of said circuits including a respective resistance connected in series with a respective one of said switches across said source, said resistances being of substantially equal value, said electrical warning means including an indicator lamp, a relay having contacts connected in circuit with said indicator lamp, said resistances being formed by respective coils of said relay effective in opposite senses upon substantially concurrent operation of said switches whereby said contacts remain open, but individually effective upon the failure of one of said switches to close said contacts; and
   manually actuatable retaining means for maintaining said electrical warning means energized upon restoration of said brake networks to an operative condition upon an actuation of the electrical warning means indicative of pressure failure in either of said networks.

2. The brake system defined in claim 1, further comprising time-delay means connected with said electrical warning means for delaying operation of said electrical warning means for a period sufficient to ensure operation of both said switches when neither network is defective.

3. A brake system comprising:
   a pair of fluid-operated brake networks including substantially concurrently actuatable master-cylinder chambers and respective sets of wheel brakes communicating therewith;
   an electric source;
   switch means including a pair of fluid-responsive switches each operatively connected with a respective one of said networks and included in a respective circuit connected across said source;
   electrical warning means bridged across said circuits for energization upon the development of a differential in the current flow through said circuits upon failure of hydraulic pressure in one of said networks for indicating such failure, each of said circuits including a respective resistance connected in series with a respective one of said switches across said source, said resistances being of substantially equal value, said electrical warning means including an indicator lamp, a relay having contacts connected in circuit with said indicator lamp, said resistances being formed by respective coils of said relay effective in opposite senses upon substantially concurrent operation of said switches whereby said contacts remain open; but individually effective upon the failure of one of said switches to close said contacts; and
   a lamp connected in series with said coils across said source.

4. The brake system defined in claim 3 wherein one of said resistances is constituted by said brake lamp.

5. The brake system defined in claim 1, further comprising a test switch triggerable by the vehicle operator and connected between said source and said electrical warning means for temporarily operating same independently of said fluid-responsive switches.

6. The brake system defined in claim 1, further comprising a brake-fluid reservoir communicating with said chambers, a liquid-level-responsive switch connected between said source and said electrical warning means for operating same independently of said fluid-responsive switches upon fall of the brake-fluid level in said reservoir below a predetermined point.

7. The brake system defined in claim 1, further comprising a brake pedal shiftable through a predetermined stroke and adapted to operate said networks, said switch means further including a mechanical switch operatively connected with said brake pedal and effective upon displacement thereof through a major portion of said stroke beyond that required for normal pressurization of both said networks upon failure of one of said networks, said electrical warning means including an indicator lamp connected in series with said mechanical switch across said source, and a diode connected in series with said mechanical switch and with said brake lamp.

8. A brake system comprising:
   a pair of fluid-operated brake networks including substantially concurrently actuatable master-cylinder chambers and respective sets of wheel brakes communicating therewith;
   an electric source;

switch means including a pair of fluid-responsive switches each operatively connected with a respective one of said networks and included in a respective circuit connected across said source;

electrical warning means bridged across said circuits for energization upon the development of a differential in the current flow through said circuits upon failure of hydraulic pressure in one of said networks for indicating such failure;

a brake lamp;

a brake pedal shiftable through a predetermined stroke and adapted to operate said networks, said switch means including a mechanical switch operable by said brake pedal and connected in series with said brake lamp, said fluid-responsive switches being connected in series with said mechanical switch; and means operatively connecting said mechanical switch with said brake pedal for closure of said mechanical switch only upon application of sufficient brake force to said pedal to effect normal actuation of both said fluid-responsive switches in the absence of a defect in one of said networks; said electrical warning means including an indicator lamp, a relay having contacts in series with said indicator lamp and said source, and mechanical means engageable with the relay armature for retaining said contact means in a closed position upon energization of said relay, but manually releasable to de-energize said relay.

* * * * *

UNITED STATES PATENT OFFICE
CERTIFICATE OF CORRECTION

Patent No. 3,688,255            Dated June 6, 1972

Inventor(s) Walter C. Meuly et al.

It is certified that error appears in the above-identified patent and that said Letters Patent are hereby corrected as shown below:

Column 15, Table IV: "$CH_3COi=C_3H_7$" should read -- $CH_3CO$ iso-$C_3H_7$ --. Column 19, line 11, insert "and" after -- substituents --; and after "acid" insert -- COOH --.

Signed and sealed this 20th day of August 1974.

(SEAL)
Attest:

McCOY M. GIBSON, JR.
Attesting Officer

C. MARSHALL DANN
Commissioner of Patents